(12) United States Patent
King

(10) Patent No.: US 6,988,147 B2
(45) Date of Patent: Jan. 17, 2006

(54) METHOD OF ESTABLISHING A SECURE TUNNEL THROUGH A PROXY SERVER BETWEEN A USER DEVICE AND A SECURE SERVER

(75) Inventor: Peter F. King, Half Moon Bay, CA (US)

(73) Assignee: Openwave Systems Inc., Redwood City, CA (US)

( * ) Notice: Subject to any disclaimer, the term of this patent is extended or adjusted under 35 U.S.C. 154(b) by 929 days.

(21) Appl. No.: 09/872,997

(22) Filed: May 31, 2001

(65) Prior Publication Data

US 2002/0194292 A1 Dec. 19, 2002

(51) Int. Cl.
*G06F 13/00* (2006.01)
*H04L 9/00* (2006.01)

(52) U.S. Cl. ............... 709/239; 709/227; 713/152; 713/153

(58) Field of Classification Search ........... 709/200, 709/201, 203, 217, 218, 219, 224, 226, 227, 709/228, 229, 237, 238, 239, 240, 242; 713/151, 713/152, 153, 166
See application file for complete search history.

(56) References Cited

U.S. PATENT DOCUMENTS 6,237,093 B1 * 5/2001 Vatanen ................. 713/162
6,252,869 B1 * 6/2001 Silverman .............. 370/352
6,442,687 B1 * 8/2002 Savage .................. 713/156
6,484,257 B1 * 11/2002 Ellis ..................... 713/153
6,598,081 B1 * 7/2003 Coile et al. .............. 709/227
6,671,729 B1 * 12/2003 Gordon et al. ........... 709/227

OTHER PUBLICATIONS

Luotonen, Ari: "Tunneling TCP based protocols through Web proxy servers", Internet–Draft, pp. 1–9, Aug. 1998, XP002275009.
Khare, R.: "Upgrading to TLS Within HTTP/1.1", Network Working Group, pp. 1–13, May 2000, XP015008600.
Stevens, W.R.: "TCP/IP Illustrated, vol. 3", Addison Wesley, pp. 87–90, Reading, Massachusetts, 1996, XP002291458.
"WAP–219–TLS: WAP TLS Profile and Tunneling Specification", Wireless Application Forum Protocol, Ltd., 'Online!, pp. 1–15, Apr. 11, 2001, XP002291457, downloaded from www.wm1club.com.

* cited by examiner

*Primary Examiner*—Moustafa M. Meky
(74) *Attorney, Agent, or Firm*—Blakely, Sokoloff, Taylor & Zafman LLP

(57) ABSTRACT

A method and apparatus for establishing a secure tunnel through a proxy between a user device and a secure server on a network are described. The method comprises storing information retrievable by the proxy server, in the event of the user device sending a request to the proxy server to access the secure server during a current session with the proxy server. The information indicates that the user device wishes to access the secure server. Thereafter, the current session between the user device and the proxy server is terminated. A tunnel is set through the proxy server between the user device and the secure server (via a trusted domain proxy/firewall) in the event of the user device sending a further request to the proxy server to access the secure server.

41 Claims, 6 Drawing Sheets

METHOD OF ESTABLISHING A SECURE TUNNEL THROUGH A PROXY SERVER BETWEEN A USER DEVICE AND A SECURE SERVER

FIELD OF THE INVENTION

This invention relates to communications over a network. In particular, it relates to a method of establishing a secure tunnel through a proxy server between a user device and a remote secure server on the network.

BACKGROUND

It is desirable when sending sensitive information over a network to keep the information secret. For example, a user may be required to send his/her credit card information over the Internet in order to effect an online purchase. In order to ensure that such sensitive information is kept secret from potential eavesdroppers, the transmission control protocol (TCP/IP) suite on which the World Wide Web (WWW) is based includes secure protocols. For example, the Transport Layer in the TCP/IP suite includes the Transport Layer Security (TLS)/Secure Sockets Layer (SSL) protocols which have been designed specifically to achieve true end-to-end security. Briefly, the way these protocols work is to establish an encryption key which is shared between a user device and a remote secure server on the network. The process of establishing the shared encryption key is known as handshaking. All subsequent data transfer between the user device and the remote secure server are encrypted, both the user device and the secure server being able to decrypt the communications using the shared encryption key.

A special case occurs when a proxy server resides between the user device and the remote secure server. In this case, in order to achieve true end-to-end security, the proxy server must connect the user device to the remote secure server in order for handshaking to take place, at the end of which a shared encryption key is established between the user device and the remote secure server. This encryption key must remain unknown to the proxy server to maintain true end-to-end security.

In order to handle this special case, HyperText Transfer Protocol (HTTP), which is the primary protocol of the WWW, has a special method known as CONNECT. This method is used by a user device to instruct a proxy server to establish a connection with a remote server so that handshaking between the user device and the remote server can take place. At the end of the handshaking a shared encryption key is established between the user device and the remote secure server. Thereafter, all subsequent communications between the user device and the remote secure server are encrypted and sent to the proxy server which then acts only as a data relay between the user device and the remote secure server. This is known as tunneling through the proxy. As the proxy server does not know the encryption key, it cannot examine the data in the communications.

Many wireless devices make use of the Wireless Application Protocol (WAP) instead of the TCP/IP Protocol. The WAP protocol supports the Wireless Session Protocol (WSP) which does not have a method equivalent to the CONNECT method described above. Thus, tunneling through a proxy server in order to achieve true end-to-end secure communication between a wireless device, for example, mobile telephones, personal digital assistants (PDA's), personal information managers (PIM's), and pagers to reach a remote secure server remains a problem.

SUMMARY OF THE INVENTION

The invention provides a method and apparatus for establishing a secure tunnel through a proxy server between a user device and a secure server on a network. The method comprises receiving an initial request from a user device during a current session between the user device and the proxy server; terminating the current session if the initial request is to a secure server; and establishing a tunnel, through the proxy server, between the user device and the secure server upon receipt of a further request on the user device to access the secure server.

DETAILED DESCRIPTION OF THE DRAWINGS

Broadly, the invention provides a method of establishing a tunnel through a proxy server between a user device and a secure server. The method achieves, in a wireless environment, in essence what can be achieved using the HyperText Transfer Protocol (HTTP) CONNECT method which has no equivalent in the protocols used to support wireless devices e.g., Wireless Application Protocol (WAP).

Briefly, the HTTP CONNECT method is used to instruct a proxy to open a connection to a secure server and thereafter to simply copy data in both directions without intervening in the secure transaction. This process is known as tunneling. For example, a user device may send the following method/command to a proxy: Connect Openwave.com: 1080 HTTP/1.0 This command instructs the HTTP proxy to open a connection to "Openwave.com" on port 1080. Once the connection is established, the proxy acts like a simple data relay between the user device and the site Openwave-.com.

As mentioned above, the CONNECT method or its equivalent does not exist in WAP.

Accordingly, the invention provides a method of establishing a tunnel through a proxy server using existing protocols supported by a mobile user device. Further, the invention provides a method of operating a proxy server in order to set a tunnel in accordance with the invention.

Figure 1:
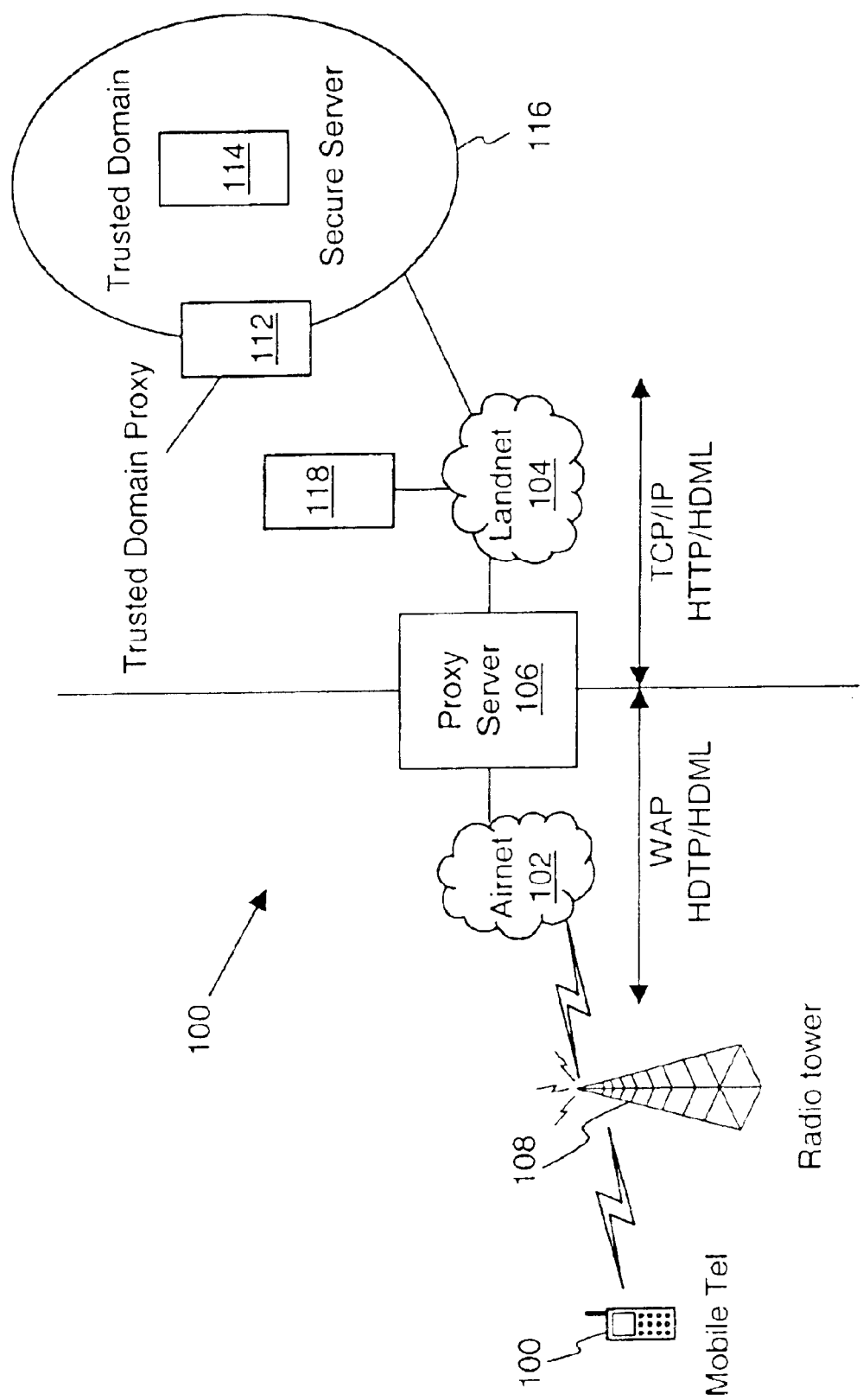
FIG. 1 shows a network environment in which various embodiments of the present invention may be practiced.

FIG. 1 shows an illustrative network environment 100 in which various embodiments of the present invention may be practiced. Network environment 100 includes a wireless network ("Airnet") 102 that is coupled to a land-based network ("Landnet") 104 via a proxy server 106.

Landnet 104 may be or may include the Internet, an intranet or a data network such as a local area network (LAN). The communications protocol supporting Landnet 104 may be, for example, HTTP or secure HTTP (SHTTP), which use the Transmission Control Protocol (TCP/IP) suite.

Airnet 102 may, for example, be a network such as a Cellular Digital Packet Data (CDPD) network, a Global System for Mobile (GSM) network, a Code Division Multiple Access (CDMA) network, or a Time Division Multiple Access Network (TDMA) network. The communications protocol used by the Airnet 102 may include, for example, Wireless Application Protocol (WAP) and/or Hand-held Device Protocol (HDTP) which use the User Datagram Packet (UDP/IP) protocol. Airnet 102 includes a transceiver base station 108 which facilitates wireless communications within its respective cell. As shown, a mobile communications device in the form of a mobile telephone 110 may operate within the area served by Airnet 102.

Airnet 102 connects to Landnet 104 via proxy server 106. Proxy server 106 serves to convert communications as they pass between Airnet 102 and Landnet 104 and thus functions as a gateway server. Coupled to Landnet 104 is a trusted domain proxy/firewall server 112 which forms part of a firewall implementation around a secure server 114.

Proxy server 106 supports communications according to HTTP on the Landnet 104 side and communications according to HDTP and/or WAP on Airnet 102 side. Proxy server 106 also has software and/or hardware to provide various services to the mobile telephone 110 as will be described in greater detail below. The trusted domain proxy/firewall server 112 may be a conventional firewall proxy server which provides conventional firewall functionality in the form of a firewall 116 around the secure server 114. The trusted domain proxy/firewall also provides WAP to HTTP protocol conversion.

In order to facilitate ease of discussion, it will be assumed that secure server 114 is the secure server for a fictitious banking organization known as Fake Bank having a Uniform Resource Locator (URL) HTTP:// www.FakeBank.com. It is also be assumed that the Fake Bank has a non-secure mirror server which lies outside the area protected by firewall 116. This non-secure server is designated 118 in FIG. 1.

Figure 2:
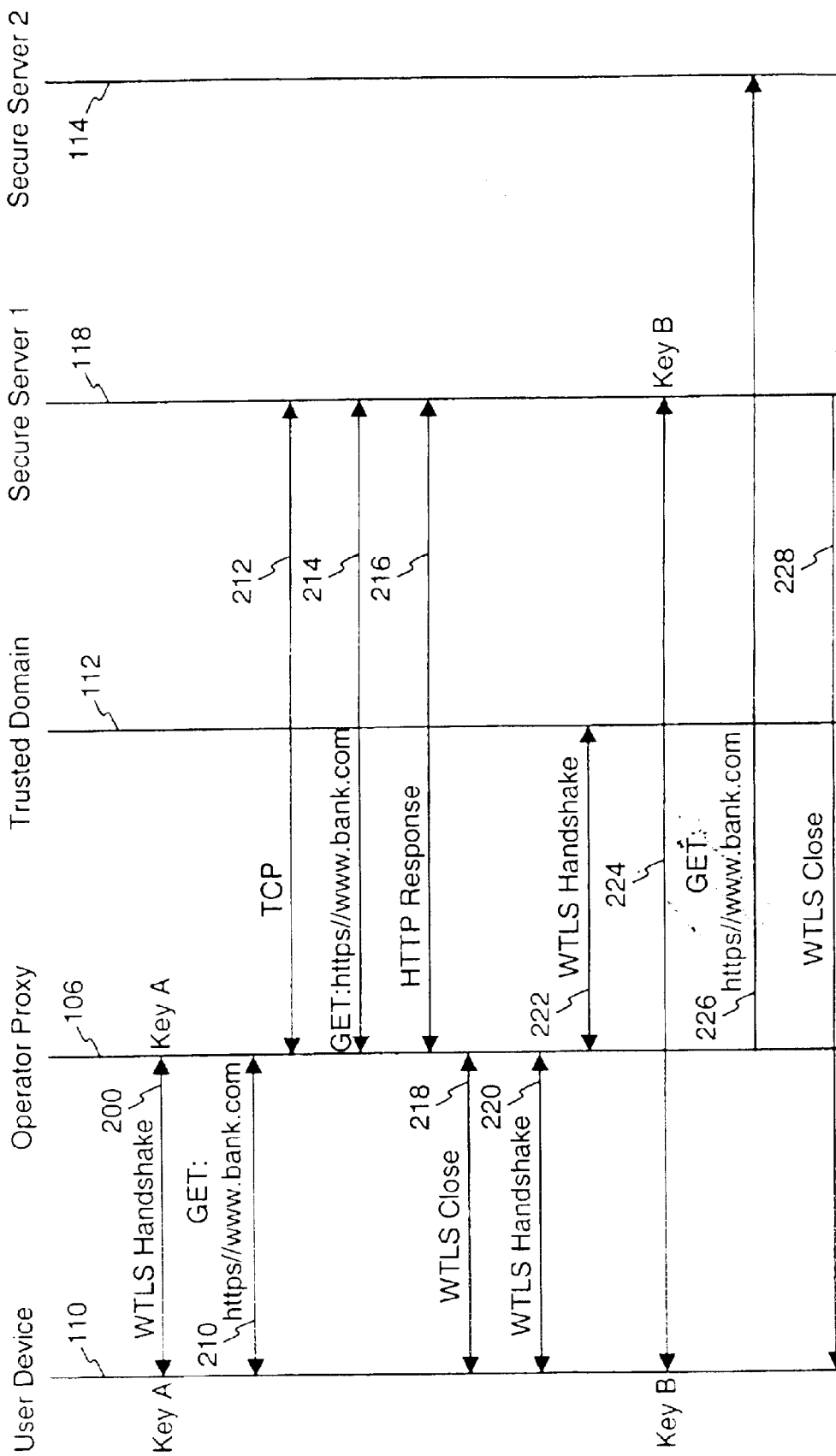
FIG. 2 shows the sequence of events which occur when a user device attempts to communicate with a secure server, in accordance with the invention.

FIG. 2 of the drawings shows the sequence of events which occur when a user device in the form of the mobile telephone 110 attempts to communicate with secure server 114. As will be seen, at 200 mobile telephone 110 performs a handshake with proxy server 106, which in this scenario will be provided by the carrier operator of Airnet 102. The handshake is in accordance with a secure protocol known as Wireless Transport Layer Security Protocol (WTLS) which is the security layer of WAP. The goal of the handshake is to establish a shared key, say Key A, between the mobile telephone 110 and the proxy server 106.

Figure 3:
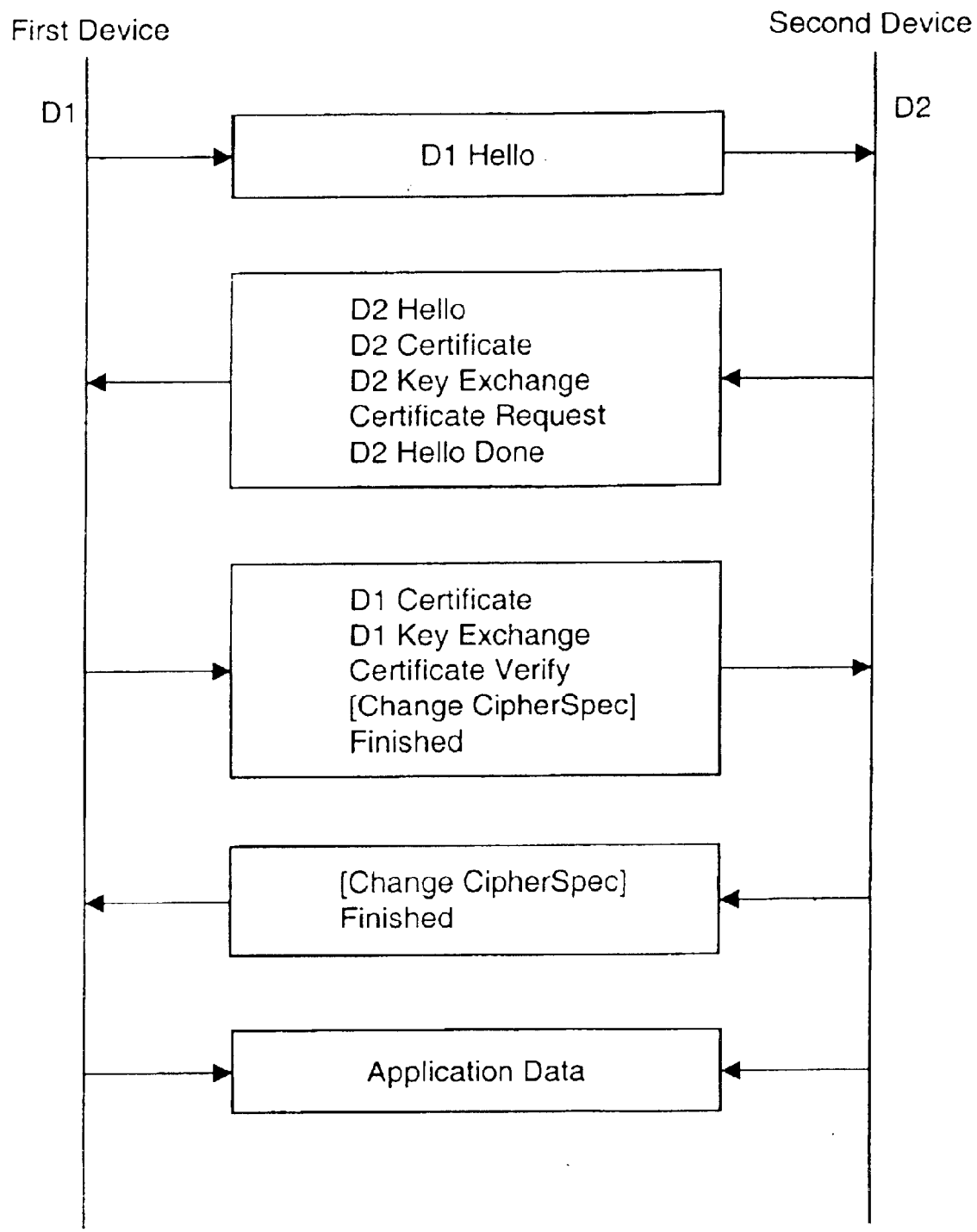
FIG. 3 shows the actions which occur during handshaking, in greater detail.

The sequence of steps which occur during a typical handshake is shown in FIG. 3 of the drawings. Referring now to FIG. 3 of the drawings, device D1 represents the mobile telephone 110 and device D2 represents proxy server 106 in the example of the WTLS handshake 200 (see FIG. 2 of the drawings). The handshake 200 starts with a "hello message," which is sent by mobile telephone 110 to proxy server 106. Proxy server 106 responds to the message with a return "hello message." In the two hello messages, devices D1, D2 agree on the session capabilities. For example, device D1 announces the supported encryption algorithms and the trusted certificates known to D1, and device D2 responds by determining session properties to be used during the session. After device D1 has sent the hello messages, it starts receiving messages until the D2 "hello done" message is received. Device D2 then sends a server certificate message in which it authenticates itself.

Thereafter, device D1 sends a "key exchange" message containing either a pre-master secret encrypted with device D2's public key or the information that is required to complete the key exchange. Finally, device D1 sends a "finished message" which contains verification of all previous data including the calculated security related information.

Device D2 then responds with a "finished message" where it also verifies the exchange and the calculated information. In addition, either device must send a change cipher specification. By means of this message the devices decide that they start using the negotiated session parameters.

WTLS also supports an abbreviated handshake where only the "hello" and the "finished" messages are sent. In this case, both parties must have a shared secret, which is used as a pre-master secret.

As mentioned above, after the WTLS handshake 200, both the mobile telephone 110 and the proxy server 106 share the encryption key, Key A. At step 210, mobile telephone 110 sends the request GET: HTTPS:// www.FakeBank.com, which is a secure HTTP command to access the FakeBank.com website on server 114. Proxy server 106 responds to this instruction by establishing a TCP connection 212 with the non-secure server 118 which responds at 216 with a message indicating that server 114 is a secure server requiring end-to-end secure data transfer. Thus, proxy server 106 learns that the request the URL:HTTPS ://www.FakeBank.com is to a end-to-end secure URL. In response, proxy server 106 terminates the secure session with mobile telephone 110 at step 218. It is to be understood that steps 212 to 216 are performed in order for proxy server 106 to learn that the instruction GET: HTTPS:// www.FakeBank.com is directed to a secure server requiring end-to-end secure data transfer. In other embodiments, the proxy server 106 may be pre-provisioned with a list of secure servers requiring end-to-end secure data transfer against which it would perform a match of the URL for FakeBank.com in order to identify whether the FakeBank-.com requires end-to-end secure data transfer or not.

The instruction 218 to close the WTLS session with mobile telephone 110 may be performed by sending a standard error message which tells mobile telephone 110 to resend the request to proxy server 106. Thereafter, at step 220, mobile telephone 110 initiates a further WTLS handshake with proxy server 106. However, proxy server 106 now knows that mobile telephone 110 wishes to communicate with a secure server. As a result, proxy server 106 responds by going into "tunnel mode" in which it maps the inbound UDP socket to the outbound UDP socket and forwards the data directly to the proxy/firewall 112. In essence, this allows mobile telephone 110 to handshake directly with trusted domain proxy/firewall 112. At the end of this handshaking, at 222, a shared encryption key, say Key B, is established between mobile telephone 110 and trusted domain proxy/firewall 112. Once Key B has been established, then at 226, the message GET: HTTPS:// www.FakeBank.com is allowed by trusted domain proxy/ firewall 112 to reach secure server 114. All subsequent communications between mobile device 110 and secure server 114 are then tunneled through proxy server 106 using the mapping between the inbound UDP socket and the outbound UDP socket. At step 228, a WTLS close is performed in order to end communications between mobile device 110 and secure server 114.

Figure 4:
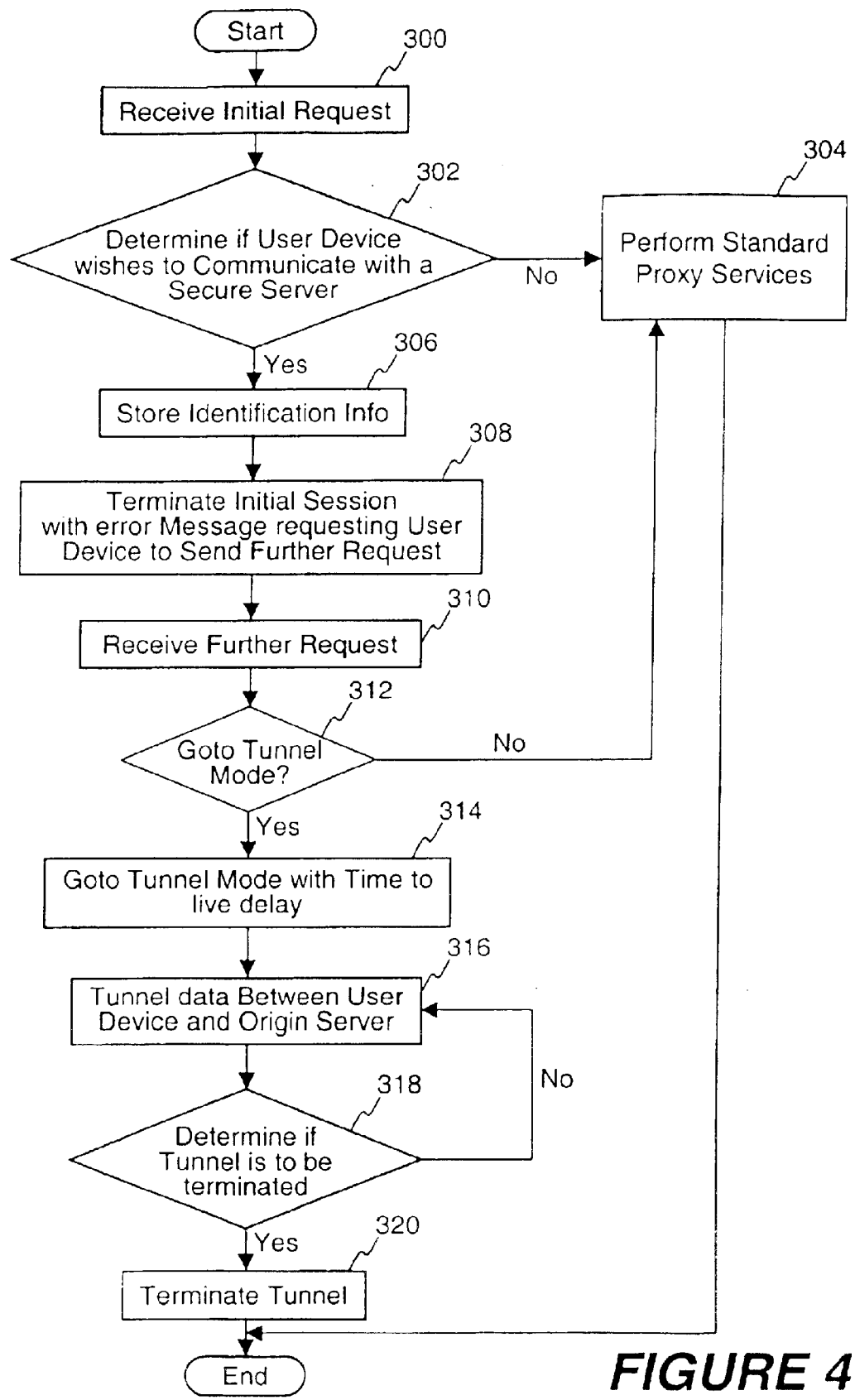
FIG. 4 shows a flow chart illustrating the operation of a proxy server in accordance with the invention.

FIG. 4 of the drawings shows a flowchart illustrating the invention as described within reference to FIG. 3 of the drawings. Referring to FIG. 4, at 300, proxy server 106 receives an initial request from mobile telephone 110. At 302, proxy server 106 makes a determination as to whether the mobile telephone 110 wishes to communicate with a secure server.

As mentioned above, this may be done by communicating with the non-secure server 118 (see steps 212 to 216, discussed with reference to FIG. 2 of the drawings); or by pre-provisioning a list of secure servers in proxy server 106. If it is determined that the initial request is not to a secure server, then proxy server 106 performs its standard proxy services. This is indicated by block 304 in the flowchart. However, if it is determined that the initial request is directed to a secure server, then at 306, proxy server 106 stores sufficient information in order to identify mobile telephone 110 and secure server 114 with which it wishes to communicate. Thereafter at 308, proxy server 106 terminates the secure session with mobile telephone 110. This is done by sending a standard error message which, when received by mobile telephone 110 causes telephone 110 to send a further request to proxy server 106 to contact secure server 114. At 312, proxy server 106 makes a determination as to whether it should go "tunnel mode" or not. This is done by matching the incoming request with the stored information in order to identify firstly that the request is from mobile telephone 110 and secondly that it is directed to secure server 114. If a positive match is made, then at 314 proxy server 106 goes into tunnel mode with a time-to-live delay. In other words, proxy server 106 will continue to operate in tunnel mode for a predetermined period of time, beyond which it will terminate the tunnel. If, on the other hand, no match is made, then proxy server 106 will continue to perform standard proxy services in a nontunnel mode. At 316, proxy server 106 will tunnel data between mobile telephone 110 and secure server 114 (via the trusted domain proxy/firewall 112) until the time to-live-delay has been reached, or it is determined, at 318, that the tunnel is to be terminated. Proxy server 106 is able to determine that the tunnel has to be terminated if mobile telephone 110 sends a request to a URL other than the URL for the Fake Bank. Alternatively, it can decide to terminate the tunnel if the trusted domain proxy/firewall 112 generates a non secure error message (on behalf of the secure server 114) which is "seen" by proxy server 106.

Figure 5:
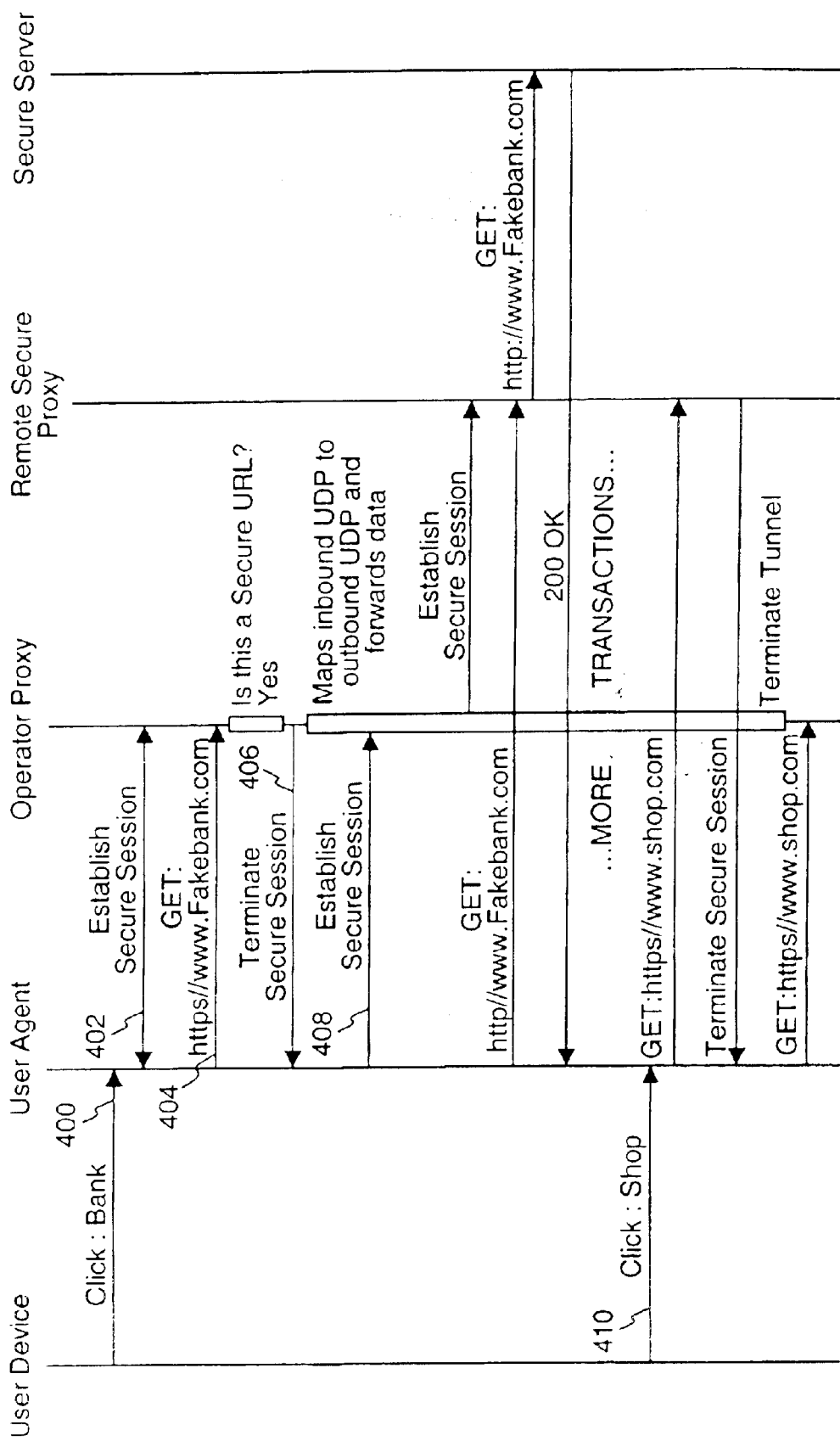
FIG. 5 shows the sequence of actions in a typical session between a mobile telephone and a secure server, in accordance with the invention.

FIG. 5 of the drawings shows the sequence of steps in a typical session between mobile device 110 and secure server 114 in accordance with the invention. At step 400, a user selects the URL for FakeBank.com, which causes a user agent associated with the user device (typically a web browser) to establish a secure session with proxy server 106, at 402. Thereafter, at 404, the message GET: HTTPS://www.FakeBank.com is sent by the user agent to proxy server 106. If it is determined by proxy server 106 that FakeBank.com is a secure site, then at 406, the secure session with the user agent it terminated with a standard error message which causes mobile telephone 110 to re-establish a secure session with proxy server 106. This secure session is re-established at 408 and if proxy server 106 recognizes that mobile telephone 110 is trying to reach secure server 114, it will go into "tunnel mode," in which it maps the inbound UDP socket to the outbound UDP socket and forwards the message GET: HTTPS://www.FakeBank.com to the trusted domain proxy/firewall 112. After initial handshaking between mobile telephone 110 and trusted domain proxy/firewall 112 as described above, a shared encryption key is established therebetween. Thereafter, secure transactions may take place between mobile telephone 110 and secure server 114. At 410 it is assumed that the user selects the URL for the site Shop.com, which causes, at 412, the request GET: http://www.Shop.com to be forwarded by proxy server 106 to trusted domain proxy/firewall 112. It will be appreciated that because of encryption, proxy server 106 is unable to view the payload portion of data sent in communication between mobile telephone 110 and secure server 118. For this reason proxy server 106 is unable to ascertain that the request get: http://Shop.com should not be forwarded to the trusted domain proxy/firewall 112. In response, trusted domain proxy/firewall 112 responds with an unencrypted error message which is seen by proxy server 106 which as a result terminates the tunnel.

Figure 6:
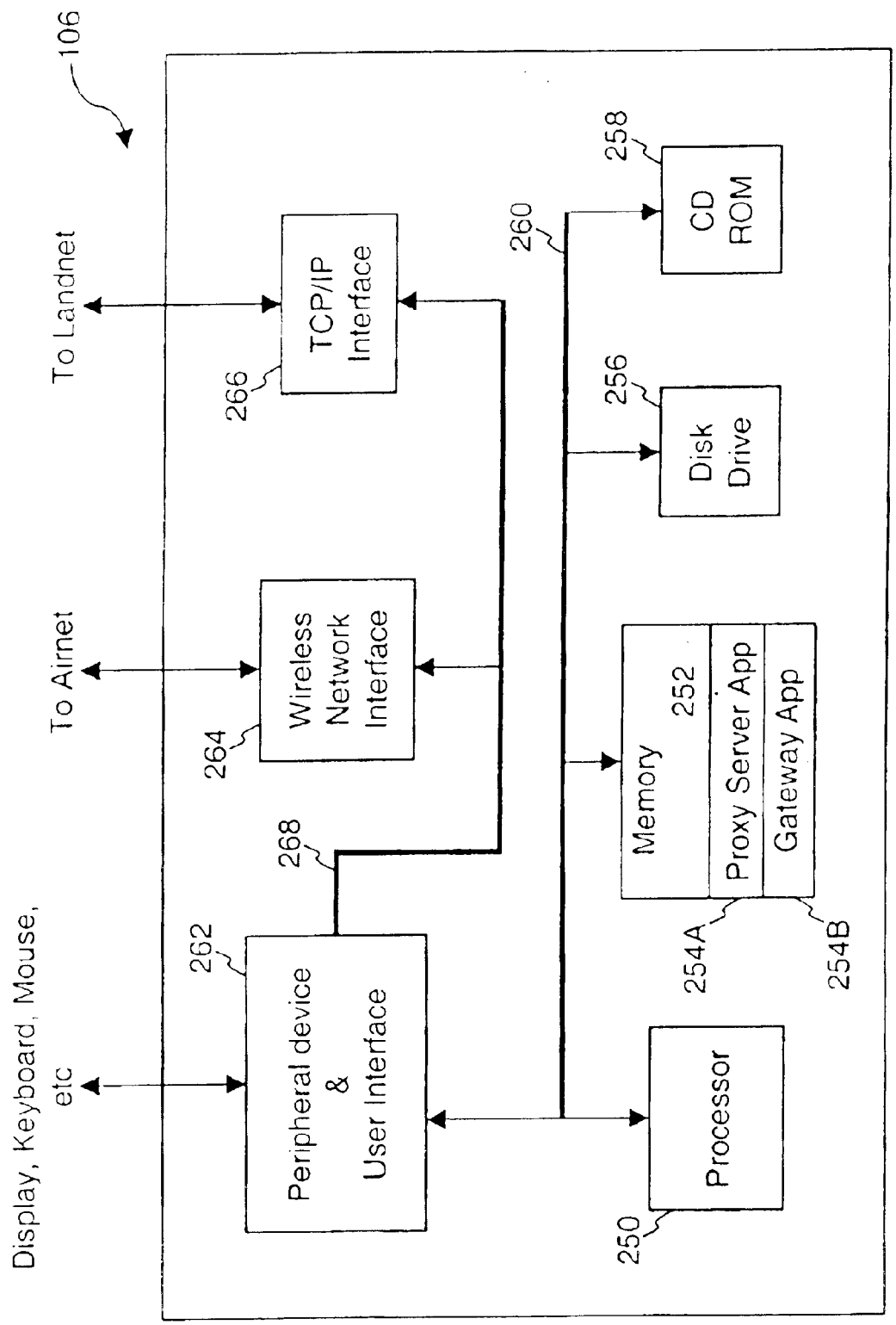
FIG. 6 shows a block diagram of a proxy server in accordance with the invention.

Referring now to FIG. 6 of the drawings, reference numeral 106 generally indicates one embodiment of a proxy server in accordance with the invention. Proxy server 106 includes memory 252, which may represent one or more physical memory devices, which may include any type of Random Access Memory (RAM), Read Only Memory (ROM) (which may be programmable), flash memory, non-volatile mass storage device, or a combination of such memory devices. Proxy server 106 has loaded in memory 250, a proxy server application 254A and a gateway application 254B. The illustrated proxy server 106 further includes a disk drive 256, and a CD-ROM drive 258 coupled to a peripheral device-and-user interface 262 via a process bus 260. Processor 250, memory device 252, disk drive 256 and CD-ROM 258 are generally known in the art. Peripheral device-and-user interface 262 provides an interface between processor bus 260 and various components connected to a peripheral bus 268 as well as to user interface components, such as display, mouse, and other user interface devices. A wireless network interface 264, and a landnet interface 266 are coupled to peripheral bus 268. Each of these interfaces 264, 266, may comprise a peripheral component card coupled to peripheral bus 268. Wireless network interface 264 couples proxy server 106 to landnet 104 and operates according to protocols as previously described. When executing program instructions written according to the principals of the present invention, proxy server 106 is able to perform the operations described herein, particularly with reference to FIG. 4 of the drawings.

One advantage of the present invention is that it allows a mobile communications device to achieve true end-to-end secure communications with a remote server (contained within a trusted domain) by tunneling through an operator proxy. The tunnel is set using existing protocols known to the mobile communications device. This obviates the need to modify or reprogram currently deployed mobile communications devices.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method of operating a proxy server, the method comprising:

receiving an initial request from a user device during a current session between the user device and the proxy server;

terminating the current session if the initial request is to a secure server; and establishing a tunnel, through the proxy server, between the user device and the secure server, via a trusted domain proxy/firewall, upon receipt of a further request from the user device to access the secure server if the initial request is to a secure server.

2. The method of claim 1, further comprising determining whether the initial request is to a destination address of a secure server.

3. The method of claim 2 wherein determining whether the initial request is to a destination address of a secure server comprises finding a match of the destination address of the secure server in a pre-provisioned list of secure servers in the proxy server.

4. The method of claim 2 wherein determining whether the initial request is to a destination address of a secure server comprises forwarding the request to a non-secure server associated with the destination address and receiving an error message in response thereto, which message is indicative that the destination address is that of a secure server.

5. The method of claim 1 further comprising waiting a predetermined period for the further request.

6. The method of claim 1 wherein establishing the tunnel comprises storing state information in order to identify the further request as being associated with the initial request.

7. The method of claim 1 wherein terminating the current session comprises sending an error message to the user device which causes the user device to send the further request to the proxy server.

8. The method of claim 7 wherein the error message is a standard error message in a protocol supported by the user device.

9. The method of claim 1 wherein establishing the tunnel comprises opening a socket with the trusted domain proxy/firewall and mapping the socket to an inbound socket opened with the user device upon receipt of the further request.

10. The method of claim 1 further comprising establishing a time-to-live delay for the tunnel, beyond which time the tunnel is terminated.

11. The method of claim 1 which comprises terminating the tunnel upon the occurrence of a predetermined event.

12. The method of claim 11 wherein the predetermined event comprises receiving a request from the user device to access a server other than the secure server.

13. The method of claim 11 wherein the predetermined event comprises the termination of the session between the user device and the trusted domain proxy/firewall at the instance of the trusted domain proxy/firewall.

14. A machine readable program storage medium, having code stored therein, which when executed on a proxy server causes the proxy server to perform a method comprising receiving an initial request from a user device during a current session between a user device and the proxy server;

terminating the current session if the initial request is to a secure server; and establishing a tunnel, through the proxy server, between the user device and the secure server, via a trusted domain proxy/firewall, upon receipt of a further request from the user device to access the secure server if the initial request is to a secure server.

15. The machine readable program storage medium of claim 14, wherein the method comprises determining whether the initial request is to a destination address of a secure server.

16. The machine readable program storage medium of claim 15, wherein determining whether the initial request is to a destination address of a secure server, comprises finding a match of the destination address in a pre-provisioned list of secure servers in the proxy.

17. The machine readable program storage medium of claim 16, wherein determining whether the initial request is to a destination address of a secure server comprises forwarding the request to a non-secure server associated with the destination address and receiving an error message in response thereto, which message is indicative that the destination address is that of a secure server.

18. The machine readable program storage medium of claim 14, wherein the method further comprises waiting a predetermined period for the further request.

19. The machine readable program storage medium of claim 14, wherein establishing the tunnel comprises storing state information in order to identify the further request as being associated with the initial request.

20. The machine readable program storage medium of claim 14, wherein terminating the current session comprises sending an error message to the user device which causes the user device to send the further request to the proxy server.

21. The machine readable program storage medium of claim 20, wherein the error message is a standard error message in a protocol supported by the user device.

22. The machine readable program storage medium of claim 14, wherein establishing the tunnel comprises opening a socket with the trusted domain proxy/firewall and mapping the socket to an inbound socket opened with the user device upon receipt of the further request.

23. The machine readable program storage medium of claim 14, wherein the method further comprises establishing a time-to-live delay for the tunnel, beyond which time the tunnel is terminated.

24. The machine readable program storage medium of claim 14, wherein the method comprises terminating the tunnel upon the occurrence of a predetermined event.

25. The machine readable program storage medium of claim 24, wherein the predetermined event comprises receiving a request from the user device to access a server other than the secure server.

26. The machine readable program storage medium of claim 24, wherein the predetermined event comprises the termination of the session between the user device and the trusted domain proxy/firewall at the instance of the trusted domain proxy/firewall.

27. A proxy server comprising:

a processor; and a memory device, having stored therein a code, which when executed by the processor, causes the proxy server to:

receive an initial request from a user device during a current session between the user device and the proxy server;

terminate the current session if the initial request is to a secure server; and establish a tunnel, through the proxy server, between the user device and the secure server, via a trusted domain proxy/firewall, upon receipt of a further request from the user device to access the secure server if the initial request is to a secure server.

28. The proxy server of claim 27, wherein the code comprises instructions to determine whether the initial request is to a destination address of a secure server.

29. The proxy server of claim 28, wherein determining whether the initial request is to a destination address of a secure server comprises finding a match of the destination address of the secure server in a pre-provisioned list of secure servers in the proxy server.

30. The proxy server of claim 29, wherein determining whether the initial request is to a destination address of a secure server comprises forwarding the request to a non-secure server associated with the destination address and receiving an error message in response thereto, which message is indicative that the destination address server is that of a secure server.

31. The proxy server of claim 28, wherein the code further comprises instructions for waiting a predetermined period for the further request.

32. The proxy server of claim 28, wherein establishing the tunnel comprises storing state information in order to identify the further request as being associated with the initial request.

33. The proxy server of claim 28, wherein terminating the current session comprises sending an error message to the user device which causes the user device to send the further request to the proxy server.

34. The proxy server of claim 33, wherein the error message is a standard error message in a protocol supported by the user device.

35. The proxy server of claim 28, wherein establishing the tunnel comprises opening a first socket with the trusted domain proxy/firewall and mapping the socket to an inbound socket opened with the user device upon receipt of the further request.

36. The proxy server of claim 28, wherein the code further comprises instructions to establish a time-to-live default for the tunnel, beyond which time the tunnel is terminated.

37. The proxy server of claim 27, wherein the code further comprises instructions to terminate the tunnel upon the occurrence of a predetermined event.

38. The proxy server of claim 37, wherein the predetermined event comprises receiving a request from the user device to access a server other than the secure server.

39. The proxy server of claim 38, wherein the predetermined event comprises the termination of a session between the user device and the trusted domain proxy/firewall at the instance of the trusted domain proxy/firewall.

40. A proxy server comprising:
means for receiving an initial request from a user device during a current session between the user device and the proxy server;
means for terminating the current session if the initial request is to a secure server; and
means for establishing a tunnel, through the proxy server, between the user device and the secure server, via a trusted domain proxy/firewall, upon receipt of a further request from the user device to access the secure server.

41. A method of operating a proxy server, a method comprising:
receiving an initial request from a user device during a current session between the user device and the proxy server;
determining whether the initial request is to a secure server;
terminating the current session between the user device and the proxy server if the initial request is to a secure server, the current session being terminated with a standard error message in a protocol understood by the user device which message causes the user device upon receipt of the error message to re-send the request to the proxy server; and
upon receipt of the re-sent request within a predetermined time, opening a socket with a trusted domain proxy/firewall and mapping the socket with an inbound socket opened between the proxy server and the user device.

* * * * *